Figure 4:
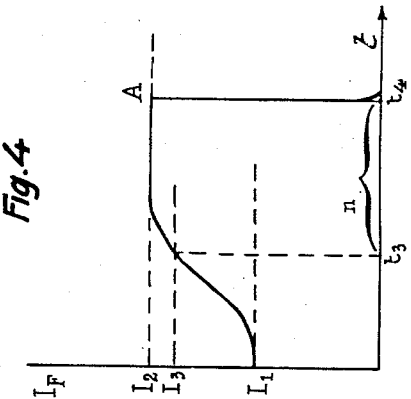

Aug. 14, 1951  B. MICHEL  2,564,021
HARDENING STEEL PARTS BY HIGH-FREQUENCY ENERGY
Filed Oct. 4, 1945  2 Sheets-Sheet 1
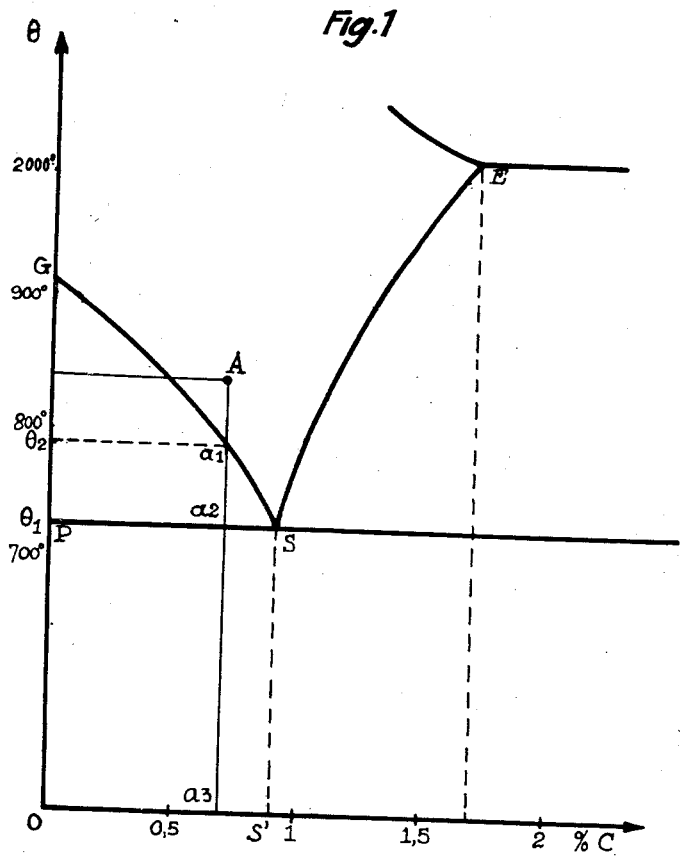
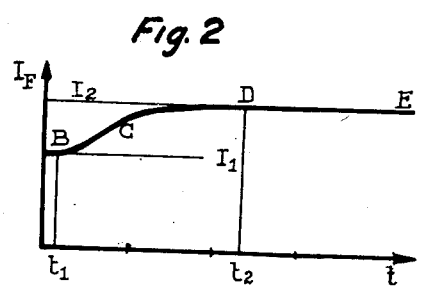
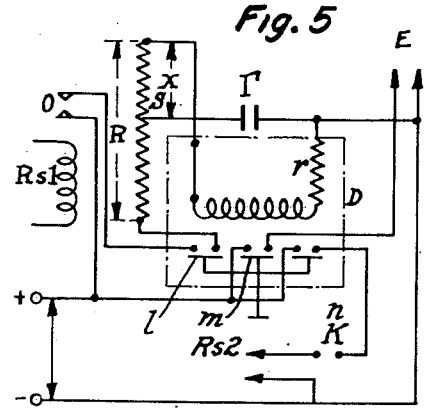
Inventor
BERNARD MICHEL
By Haseltine, Lake & Co.
Attorneys Inventor
BERNARD MICHEL
By Haseltine Lake & Co.
Attorneys.

Patented Aug. 14, 1951

2,564,021

UNITED STATES PATENT OFFICE 2,564,021

HARDENING STEEL PARTS BY HIGH-FREQUENCY ENERGY

Bernard Michel, Paris, France, assignor to Compagnie Generale de Telegraphie Sans Fil, a corporation of France Application October 4, 1945, Serial No. 620,268
In France January 24, 1942

Section 1, Public Law 690, August 8, 1946
Patent expires January 24, 1962

5 Claims. (Cl. 219—47)

1

The present invention relates to an improved process for hardening steel heated by a high frequency current induction oven and the appropriate apparatuses necessary to the carrying out of said process.

According to the invention, the process consists chiefly in utilising the current changes of a heating coil, due to modifications in the magnetic permeability and the resistivity of iron that are brought about by internal changes in the structure of steel in the course of the heating process, to determine firstly the timing of the heating operation of the steel, to be processed, and secondly to automatically cut out the heating and finally perform the hardening proper.

The apparatus appointed for the working of this process comprises essentially: a generator of high frequency currents feeding the coil of a H. F. induction oven: a valve, of the thyratron type, the grid of which is supplied with a contactmaker (switch) controlled by a relay energized straight off the thyratron valve, the said switch controlling and timing the heating operation, the release into the quenching bath of the piece of steel to be processed and finally the cutting out of the high frequency generator.

Other characteristics of the invention will be laid out in the following description.

The invention is based on the following principle.

During the heating operation of the steel to be processed as shown in Fig. 1 and its rise up to hardening temperature the character of the steel changes along the straight line $a_3a_2a_1A$ and crosses, in its course, three different areas i. e.:

Area OPSS' ($\alpha$ iron+eutectoid S),
Area PGS ($\gamma$ solution+$\alpha$ iron), and
Area GSE ($\gamma$ solution)

as a consequence between $a_2$ and $a_1$ the following reaction takes place:

$\alpha$ iron+eutectoid $S \rightarrow \alpha$ iron+$\gamma$ solution resulting, beyond point $a_1$, in $\gamma$ iron.

If the steel is heated by induction currents one can trace the curve representing the intensity of the current, running through the coil of the oven, in relation to time (Fig. 2), said intensity changing in its BD portion corresponding to the phase of transformation of $\alpha$ iron into $\gamma$ iron. This changing of the intensity is due to corresponding changes in the permeability $\mu$ and the resistivity $\rho$ of the iron in the course of the undergoing structural changes.

According to the invention, this variation of

2 the intensity of the current flowing through the oven is used to time automatically the heating operation preceding the hardening proper.

Figure 3:
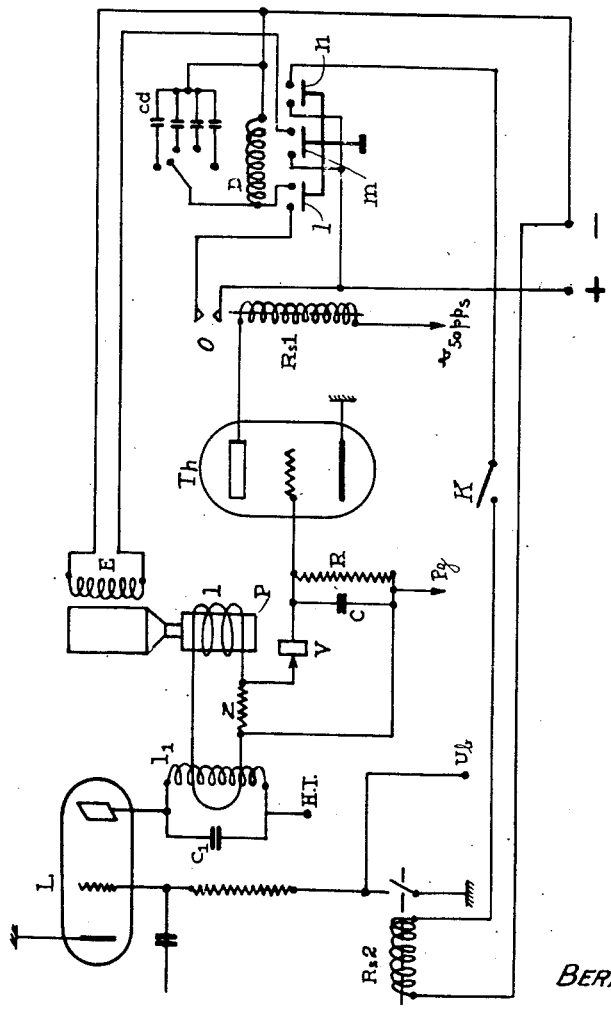

If one considers Fig. 3 the current $I_F$, flowing through the self-induction coil $l$, connected in series with the impedance Z, will produce at the terminals of said impedance, a voltage which is proportional to said current. This voltage is rectified in a positive direction by an appliance comprising a rectifier V (either a valve or a dry surface rectifier) and a resistance R shunted by a condenser C. The rectified current produces at the terminals of resistance R a voltage which is proportional to the amplitude of $I_F$, which voltage is applied to the grid of thyratron valve T$h$, the plate of which is connected, through the relay R$s_1$, to a 50 cycles per second alternating-current supply. The grid of the thyratron valve is biased by applying at P$g$ a voltage that can be controlled in such way that a plate-current of said thyratron valve will only appear when the current I equals, at least, the value of $I_3$ set in advance (Fig. 4). In the resting position the contacts O of the relay R$s_1$ are closed, and so at that point is the circuit of the relay D. The armature of switch D bears three contacting strips $l$, $m$, $n$; the first, $l$, being used to maintain said armature attracted, the second, $m$, closing the circuit of electro-magnet E which is used for attracting and holding in the oven $l$ the piece P to be tempered, finally the third strip $n$ which closes the circuit of a relay R$s_2$ serving to control the de-blocking of the valve L used as a generator of high frequency currents. A switch K is inserted in the latter circuit.

To the terminals of the winding of switch D are connected a set of condensers C$d$ which exert a delaying action and cause the opening of the contacts of D to be retarded in relation to the opening of the contact of R$s_1$.

The apparatus works as follows:

By pushing the button of switch D the three contacts $l$, $m$, $n$ are closed and coil D is excited. The electromagnet E being energized one can fix onto it the piece P, to be tempered. The circuit of the relay R$s_2$ is then closed, by pushing switch K, the closing of the contacts of which will de-block the generator valve L. A current having an intensity of $I_F$ flows through the oven while the piece P is being heated. At time $t_3$ (Fig. 4) when the intensity $I_F$ reaches the value $I_3$, set in advance, the thyratron valve is deblocked, thus causing the relay R$s_1$ to become energized whereupon its contacts O open. The circuit of switch D thus being open, the condensers Cd become discharged through the winding D; the time of the discharge of said condensers (n seconds) is set in advance. Contacts l, m, and n open. The time n depends on the capacity of the condensers Cd. At instant $t_4=(t_3+n)$ at which the temperature of the steel attains the point A, in Fig. 1, i. e. hardening temperature, the current energizing the electro-magnet is cut off while piece P drops into the quenching bath. At the same instant Rs2 comes back to rest while generator valve L becomes blocked due to a blocking voltage applied at Ub.

The control of the thyratron valve is set for a current I3 drawn preferably from that portion of the curve $I_F=f(t)$, where the slope is greatest, thus assisting in setting the time $t_3$ with greater accuracy.

The choice of the condensers Cd is governed by the depth of the desired penetration of the hardening of the steel.

A different and improved arrangement of the invention is represented in Fig. 5.

In this apparatus a contact-switch, possessing a continued controlling system, enables one to time with great accuracy the heating operation and the instant at which the hardening has to take place. This device takes the place of the discontinued arrangement comprising the relay D and the set of condensers Cd in Fig. 3.

In Fig. 5 the same elements or those performing similar duties are represented by the same references.

According to the working example as represented in Fig. 5, a variable voltage is fed to the coil of th relay D off contacts O of the relay Rs1, contact strip I and potential divider R, the sliding contact of which is connected to the other terminal of the coil through a single condenser Γ.

The contact strips m and n of the relay D are used just in the same way as in the device represented in Fig. 3, to close both the circuit of the electromagnet E which holds the piece in the oven, and the circuit of the relay Rs2 controlling the de-blocking of the grid of the high frequency generator valve.

This modification works as follows:

If one pushes the button of relay D, the three contacts l, m, n will be closed and the coil of relay D will be energized.

The electromagnet E, being energized, one can fix onto same the piece of steel to be hardened. By pushing the switch K the generator valve will be de-blocked. As soon as the current flowing through the oven reaches the desired value I3 set in advance, the thyratron valve becomes de-blocked and energizes the relay Rs1 of which contacts O open.

Previous to the opening, the condenser Γ has been charged at the voltage $$\frac{U(x+r)}{R+r}$$

r representing the resistance of the coil of the relay D and x the portion of the resistance R in series with the condenser Γ and the relay. When contacts O open, the condenser discharges itself through the resistance $x+r$ and after a time $t$ has elapsed, its voltage will be $I_1(x+r)$; $I_1$ representing the intensity at the instant of the break of the relay D. At this moment the contacts l, m, n open, the electromagnet E becomes demagnetised and the piece of steel drops into the quenching bath; finally the grid of the generator valve becomes blocked.

The time $t$ is related to $x$ by the following equation:

$$I_1=\frac{U}{R+r}\cdot\frac{1}{sh\psi}e^{-at}Sh(\sqrt{a^2-\eta^2}t+\psi)$$

with:

$$a=\frac{x+r}{2L}$$

L being the inductance value of the relay $$\eta^2=\frac{1}{L\Gamma}$$

$$Th\psi=\sqrt{1-\frac{\eta^2}{a^2}}$$

Thus the time $t$ is a function depending on $x$. Hence it is easy to time the quenching operation by simply moving the sliding contact S of the potential divider. One may choose the values of the different elements in such way as to obtain a delaying action on the opening of the contacts of relay D, which delaying action rests between the limits of $t_1$ and $t_2$, where $t_1$, corresponding to $x=0$, must not exceed 1/20 of a second and $t_2$, corresponding to $x=R$ must be chosen in such way as to represent the maximum of delaying action which one may desire.

This arrangement affords the advantage of a more economical construction, since it requires but a single condenser and only one potential divider. On the other hand by simply acting on the potential divider one may obtain a continued delayed action control whereas the modification using condensers admits only discontinued adjustments. The former arrangement constitutes a great advantage since the timing of the heating operation involves very narrow limits i. e.: an operational time of approximately two seconds, requires a precision of approx. 1/10 of a second, which, in the case of the latter arrangement would involve the use of too important a set or condensers of further complicated arrangements.

It is understood that the invention is not limited to the proposed diagrams and that any similar arrangement procuring the same results may be employed. In particular the arrangement C, R, Th and Rs1 may be replaced by a relay with controllable maximum action whereas the delayed-action relay may be realized by entirely different means.

The processes and apparatuses, according to the invention, have the advantage of procuring hardening operations involving a very short heating-time; thus avoiding unnecessary increase in depth of the hardening of the steel by thermal conductivity. Since the heating-time must not exceed a duration of approximately two seconds, one must time the hardening operation in relation to the heating time with great accuracy (1/10 of a second). Only an automatic apparatus will produce this result. The present invention takes advantage of the phenomenon of the structural modification of steel in the course of the heating process, due to which small variations of the power of the oven may be tolerated without noticeably impeding the practical results.

What I claim is:

1. Apparatus for superficially hardening steel parts, comprising an electronic high frequency generator, an inductor connected to the output terminals of said generator, a relay with contacts normally closed, adjustable means connecting this relay to the inductor circuit and adapted to energize it when the heating current increasing intensity reaches a given value, a solenoid magnetic multipolar contactor, means holding it closed when operated, means enabling the control of its release by said relay, these two last mentioned means comprising a source of direct current and connections running from this source to the holding solenoid of the contactor through its contactor and through the contacts of said relay, other means for suspending the steel part to be hardened over a quenching bath by electromagnetic force, means for de-energizing the generator, connections running from the direct current source to the two last-mentioned means through two poles of the contactor, a capacitor, and adjustable means connecting it in bridge of said solenoid and means whereby said capacitor discharges current heavy enough to hold the contactor closed for a given adjustable time after the opening of the relay contacts.

2. Apparatus for superficially hardening steel parts, comprising a high frequency oscillator, an inductor connected to the output terminals of said oscillator, a first relay coil with contacts normally closed, adjustable means connecting this relay coil to the inductor circuit comprising a rectifying device, an impedance in said circuit coupled to the input of the rectifying device, a grid controlled gaseous rectifier, means connecting its grid to a biasing source through the output of said rectifying device, the plate cathode circuit of said gaseous rectifier containing the coil of said relay, a solenoid magnetic multipolar contactor, means holding it closed when operated, means enabling the control of its release by said relay, these two last mentioned means comprising a source of direct current and connections running from this source to the holding solenoid of the contactor through the contacts of said relay, a coil for suspending the steel part to be hardened over a quenching bath, connections from the direct current source to this coil through one of the poles of the contactor, a second relay adapted to de-energize the oscillator, connections from the said direct current source to this relay through another pole of the contactor, an adjustable capacitor bridging the contactor solenoid and adapted to let flow through it a discharge current sufficiently heavy to hold the contactor closed for a predetermined, adjustable time after the opening of the relay contacts.

3. Apparatus according to claim 2, in which the rectifying device comprises a rectifier, series connected to a resistance-capacity shunt circuit, said current being inserted in the connection running from a biasing source to the grid of the grid-controlled gaseous rectifier.

4. Apparatus according to claim 2, in which the inductive-capacitive circuit of the contactor comprises the holding solenoid, series connected with a given capacitor and an adjustable portion of a resistor, the extreme terminals of said resistor being normally connected to the direct current source through the contacts of the first relay.

5. Apparatus according to claim 2, including an interrupter inserted into the connections running from the direct current source to the second relay, the contacts of that relay being adapted to connect, in normally closed position, the grid of the oscillator to ground.

BERNARD MICHEL.

REFERENCES CITED

The following references are of record in the file of this patent:

UNITED STATES PATENTS

| Number | Name | Date |
|---|---|---|
| 1,194,940 | Bishop | Aug. 15, 1916 |
| 1,367,124 | Colby | Feb. 1, 1921 |
| 1,414,366 | MacDonald | May 2, 1922 |
| 1,987,458 | Adams | Jan. 8, 1935 |
| 2,059,976 | Stargardter | Nov. 3, 1936 |
| 2,295,297 | Schneider | Sept. 8, 1942 |
| 2,324,525 | Mittelmann | July 20, 1943 |
| 2,339,157 | Denneen et al. | Jan. 11, 1944 |